United States Patent
Kim et al.

(10) Patent No.: US 12,524,114 B2
(45) Date of Patent: Jan. 13, 2026

(54) STRETCHABLE TOUCH DISPLAY DEVICE

(71) Applicant: LG Display Co., Ltd., Seoul (KR)

(72) Inventors: Sungchul Kim, Goyang-si (KR); Sang-Kyu Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/951,168

(22) Filed: Nov. 18, 2024

(65) Prior Publication Data

US 2025/0264964 A1 Aug. 21, 2025

(30) Foreign Application Priority Data

Feb. 15, 2024 (KR) .................. 10-2024-0021629

(51) Int. Cl.
*G06F 3/041* (2006.01)
*G06F 3/044* (2006.01)

(52) U.S. Cl.
CPC ...... *G06F 3/04184* (2019.05); *G06F 3/04166* (2019.05); *G06F 3/0447* (2019.05); *G06F 2203/04102* (2013.01)

(58) Field of Classification Search
CPC ............. G06F 3/04184; G06F 3/04166; G06F 3/0447; G06F 2203/04102
See application file for complete search history.

(56) References Cited

U.S. PATENT DOCUMENTS

| | | | | |
|---|---|---|---|---|
| 9,228,822 | B2* | 1/2016 | Majidi | G01B 7/18 |
| 2013/0312541 | A1* | 11/2013 | Majidi | G01B 7/28 |
| | | | | 73/862.454 |
| 2014/0347273 | A1* | 11/2014 | Arrasvuori | G06F 3/0412 |
| | | | | 345/158 |
| 2015/0033193 | A1* | 1/2015 | Beaurepaire | G06F 3/0487 |
| | | | | 715/863 |
| 2015/0277655 | A1* | 10/2015 | Kim | G06F 3/0412 |
| | | | | 345/174 |
| 2016/0246331 | A1* | 8/2016 | Cho | G06F 3/0418 |
| 2017/0365210 | A1* | 12/2017 | Wang | B33Y 80/00 |
| 2018/0113032 | A1* | 4/2018 | Dickey | G06F 3/0446 |

FOREIGN PATENT DOCUMENTS

KR 10-2430054 B1 8/2022

\* cited by examiner

*Primary Examiner* — Afroza Chowdhury
(74) *Attorney, Agent, or Firm* — Birch, Stewart, Kolasch & Birch, LLP

(57) ABSTRACT

Discussed is a stretchable touch display device that improves touch performance by eliminating a ghost touch caused by change in a shape of a touch panel. The stretchable touch display device includes a display panel, a touch sensor configured to detect a touch on the display panel, a strain sensor configured to detects a change in a shape of the display panel, and a controller configured to determine whether there is the change in the shape of the display panel, based on a detection signal from the strain sensor, and upon determination that there is the change in the shape in the display panel, compensate for a change in touch raw data of the touch sensor, based on the change in the shape of the display panel.

18 Claims, 8 Drawing Sheets

| -2 | 2 | 5 | 0 | 4 | 3 | -2 | -3 | 4 | 0 | 4 |
|---|---|---|---|---|---|---|---|---|---|---|
| 2 | 3 | -4 | 3 | -2 | -1 | 3 | -2 | 0 | -1 | 1 |
| 0 | 1 | -1 | 2 | 1 | -2 | -1 | 1 | -1 | 5 | 3 |
| 2 | 4 | -3 | 4 | 3 | 4 | 0 | -5 | 2 | -3 | 2 |
| 0 | -1 | 0 | 5 | -5 | -2 | 5 | 3 | 3 | -1 | 0 |
| -3 | -2 | -4 | 1 | 0 | 3 | 1 | 0 | 0 | 4 | -1 |
| -1 | 3 | 2 | -5 | 3 | 1 | 2 | 3 | 1 | 0 | 3 |
| 1 | -2 | 3 | 0 | -1 | 4 | -3 | -4 | 1 | 2 | -2 |
| 5 | 0 | 4 | 2 | -2 | -2 | 2 | 2 | -4 | -3 | 4 |
| -3 | 1 | 2 | -3 | 4 | -3 | -4 | 1 | 5 | 1 | 0 |

Change in touch raw data

| -2 | 50 | 55 | 71 | 49 | 94 | -2 | -3 | 4 | 0 | 4 |
|---|---|---|---|---|---|---|---|---|---|---|
| 2 | 3 | -4 | 86 | -2 | 74 | 91 | -2 | 0 | -1 | 1 |
| 0 | 1 | -1 | 2 | 33 | 36 | -1 | 1 | -1 | 5 | 3 |
| 2 | 4 | -3 | 4 | 3 | 4 | 0 | 78 | 81 | 56 | 2 |
| 0 | -1 | 0 | 5 | -5 | -2 | 5 | 90 | 34 | -1 | 0 |
| -3 | -2 | -4 | 1 | 0 | 3 | 74 | 93 | 0 | 80 | -1 |
| -1 | 3 | 57 | 86 | 3 | 1 | 2 | 3 | 1 | 0 | 3 |
| 1 | -2 | 46 | 53 | 76 | 4 | -3 | -4 | 1 | 2 | -2 |
| 5 | 51 | 4 | 2 | -2 | -2 | 2 | 68 | 99 | -3 | 4 |
| -3 | 1 | 2 | -3 | 4 | -3 | -4 | 64 | 58 | 1 | 0 |

FIG. 10

| -2 | 50 | 55 | 71 | 49 | 94 | -2 | -3 | 4 | 0 | 4 |
|---|---|---|---|---|---|---|---|---|---|---|
| 2 | 3 | -4 | 86 | -2 | 74 | 91 | -2 | 0 | -1 | 1 |
| 0 | -1 | -1 | 2 | 33 | 36 | -1 | 1 | -1 | 5 | 3 |
| 2 | 4 | -3 | 4 | 3 | 4 | 0 | 78 | 81 | 56 | 2 |
| 0 | -1 | 0 | 5 | -5 | -2 | 5 | 90 | 34 | -1 | 0 |
| -3 | -2 | -4 | 1 | 0 | 3 | 74 | 93 | 0 | 80 | -1 |
| -1 | 3 | 57 | 86 | 3 | 1 | 2 | -3 | -1 | 0 | 3 |
| 1 | -2 | 46 | 53 | 76 | 4 | -3 | -4 | 1 | 2 | -2 |
| 5 | 51 | 4 | 2 | -2 | -2 | 2 | 68 | 99 | -3 | 4 |
| -3 | 1 | 2 | -3 | 4 | -3 | -4 | 64 | 58 | 1 | 0 |

↓ Compensation for change in touch raw data

| -2 | 2 | 5 | 0 | 4 | 3 | -2 | -3 | 4 | 0 | 4 |
|---|---|---|---|---|---|---|---|---|---|---|
| 2 | 3 | -4 | 3 | -2 | -1 | 3 | -2 | 0 | -1 | 1 |
| 0 | 1 | -1 | 2 | 1 | -2 | -1 | 1 | -1 | 5 | 3 |
| 2 | 4 | -3 | 4 | 3 | 4 | 0 | -5 | 2 | -3 | 2 |
| 0 | -1 | 0 | 5 | -5 | -2 | 5 | 3 | 3 | -1 | 0 |
| -3 | -2 | -4 | 1 | 0 | 3 | 1 | 0 | 0 | 4 | -1 |
| -1 | 3 | 2 | -5 | 3 | 1 | 2 | 3 | 1 | 0 | 3 |
| 1 | -2 | 3 | 0 | -1 | 4 | -3 | -4 | 1 | 2 | -2 |
| 5 | 0 | 4 | 2 | -2 | -2 | 2 | 2 | -4 | -3 | 4 |
| -3 | 1 | 2 | -3 | 4 | -3 | -4 | 1 | 5 | 1 | 0 |

STRETCHABLE TOUCH DISPLAY DEVICE

CROSS-REFERENCE TO RELATED APPLICATION

This application claims priority to Korean Patent Application No. 10-2024-0021629 filed on Feb. 15, 2024 in the Korean Intellectual Property Office, the entire contents of which are hereby expressly incorporated by reference into the present application.

BACKGROUND

Field

The present disclosure relates to a stretchable touch display device.

Discussion of the Related Art

Nowadays, various display devices are used in different fields, including in computer monitors, TVs, mobile phones, etc. Types of display devices that are in use today include organic light-emitting display device (OLED) that emits light on its own, a liquid crystal display device (LCD) that requires a separate light source, etc.

However, the scope of application of display devices is becoming more diverse, and there is great demand for small sized personal portable devices. Accordingly, much research is being conducted on display devices with a relatively large display area size and a reduced volume and weight.

Recently, a stretchable display device is attracting attention as a next-generation display device for use in various fields. The stretchable display device can be manufactured by forming a display unit, and wirings on a flexible substrate so that the device is stretchable and contractable in a specific direction and can change into various shapes. Such a device can greatly improve portability and utility of the display device in various settings.

SUMMARY OF THE DISCLOSURE

A stretchable display device can be built into a wearable device. In order to provide a touch-based input scheme to such a stretchable display device, it is necessary to determine whether a user inputs a touch and accurately detect a touch coordinate.

However, in the stretchable touch display device, a shape of a touch panel can change depending on a movement of the wearable device. This can cause ghost touch to deteriorate a touch performance.

A purpose that the present disclosure aims to achieve is to provide a stretchable touch display device that can eliminate the ghost touch caused by change in the shape of the touch panel to improve touch performance.

Purposes according to the present disclosure are not limited to the above-mentioned purpose. Other purposes and advantages according to the present disclosure that are not mentioned can be understood based on following descriptions, and can be more clearly understood based on embodiments according to the present disclosure. Further, it will be easily understood that the purposes and advantages according to the present disclosure can be realized using means shown in the claims or combinations thereof.

One aspect of the present disclosure provides a stretchable touch display device including: a display panel; a touch sensor configured to detect a touch on the display panel; a strain sensor configured to detects a change in a shape of the display panel; and a controller configured to: determine whether there is a change in the shape of the display panel, based on a detection signal from the strain sensor; and upon determination that there is the change in the shape in the display panel, compensate for a change in touch raw data of the touch sensor, based on the change in the shape of the display panel.

Another aspect of the present disclosure provides a stretchable touch display device including: a display panel including a touch sensor for detecting a touch on the display panel, and a strain sensor for detecting a change in a shape of the display panel, wherein the display panel operates in a time-divided manner into a display period for image display and a touch period for touch sensing; and a touch driving circuit configured to: control an operation of each of the touch sensor and the strain sensor; determine whether there is a change in the shape of the display panel based on a detection signal from the strain sensor; and upon determination that there is a change in the shape of the display panel, compensate for change in touch raw data of the touch sensor, the change in the shape of the display panel.

According to the aspects of the stretchable touch display device, touch performance can be improved by removing the ghost touch due to the change in the shape of the touch panel.

Furthermore, the ghost touch can be eliminated by compensating for the touch raw data, based on the change of the shape of the stretchable touch panel based on the detection signal from the strain sensor.

Furthermore, the touch coordinates can be accurately detected by removing the ghost touch caused by the change in the shape of the stretchable touch panel.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

BRIEF DESCRIPTION OF THE DRAWINGS

FIG. 10 is a diagram for illustrating compensation for change in touch raw data due to change in the shape of the display panel in FIG. 2.

DETAILED DESCRIPTION OF THE EMBODIMENTS

Figure 1:
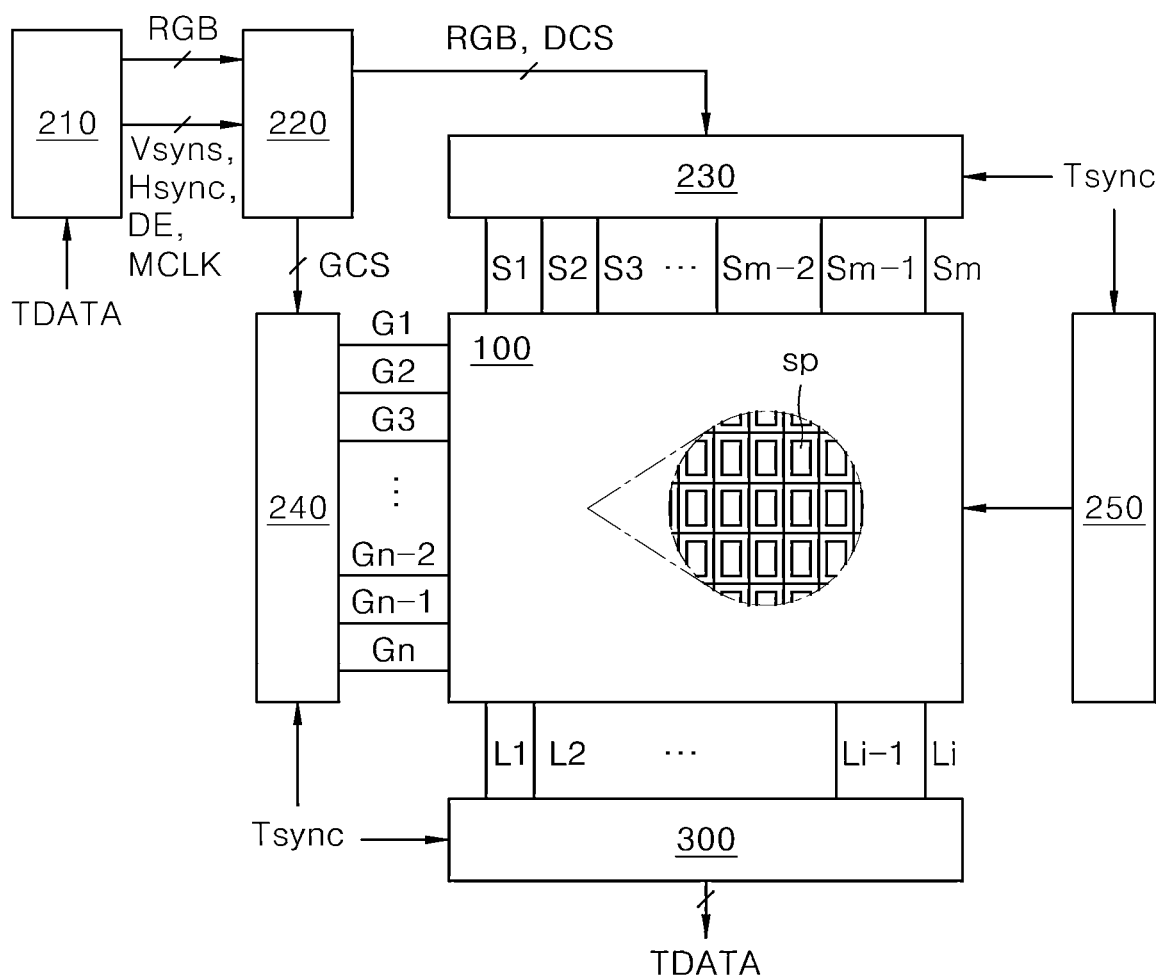
FIG. 1 is a block diagram of a stretchable touch display device according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but can be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as can be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this disclosure, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements can modify the entire list of elements and may not modify the individual elements of the list. In interpretation of numerical values, an error or tolerance therein can occur even when there is no explicit description thereof.

In addition, it will also be understood that when a first element or layer is referred to as being present "on" a second element or layer, the first element can be disposed directly on the second element or can be disposed indirectly on the second element with a third element or layer being disposed between the first and second elements or layers. It will be understood that when an element or layer is referred to as being "connected to", or "connected to" another element or layer, it can be directly on, connected to, or connected to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

Further, as used herein, when a layer, film, region, plate, or the like is disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is not indicated.

When a certain embodiment can be implemented differently, a function or an operation specified in a specific block can occur in a different order from an order specified in a flowchart. For example, two blocks in succession can be actually performed substantially concurrently, or the two blocks can be performed in a reverse order depending on a function or operation involved.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section as described under could be termed a second element, component, region, layer or section, without departing from the spirit and scope of the present disclosure.

When an embodiment can be implemented differently, functions or operations specified within a specific block can be performed in a different order from an order specified in a flowchart. For example, two consecutive blocks can actually be performed substantially simultaneously, or the blocks can be performed in a reverse order depending on related functions or operations.

The features of the various embodiments of the present disclosure can be partially or entirely combined with each other, and can be technically associated with each other or operate with each other. The embodiments can be implemented independently of each other and can be implemented together in an association relationship.

In interpreting a numerical value, the value is interpreted as including an error range unless there is no separate explicit description thereof.

It will be understood that when an element or layer is referred to as being "connected to", or "connected to" another element or layer, it can be directly on, connected to, or connected to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. For example, unless otherwise stated or clear from the context, the expression that 'x uses a or b' means any one of natural inclusive permutations.

The terms used in the description below have been selected as being general and universal in the related technical field. However, there can be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term can be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Descriptions.

In description of flow of a signal, for example, when a signal is delivered from a node A to a node B, this can include a case where the signal is transferred from the node A to the node B via another node unless a phrase 'immediately transferred' or 'directly transferred' is used.

The term "can" fully encompasses all the meanings and coverages of the term "may."

Throughout the present disclosure, "A and/or B" means A, B, or A and B, unless otherwise specified, and "C to D" means C inclusive to D inclusive unless otherwise specified.

"At least one" should be understood to include any combination of one or more of listed components. For example, at least one of first, second, and third components means not only a first, second, or third component, but also all combinations of two or more of the first, second, and third components.

Hereinafter, embodiments of the present disclosure will be described using the attached drawings. A scale of each of components as shown in the drawings is different from an actual scale thereof for convenience of illustration, and therefore, the present disclosure not limited to the scale as shown in the drawings.

Hereinafter, a stretchable touch display device according to some embodiments will be described.

FIG. 1 is a block diagram of a stretchable touch display device according to an embodiment of the present disclosure. All components of each stretchable touch display device according to all embodiments of the present disclosure are operatively coupled and configured.

The stretchable touch display device can include a display panel 100, a data driving circuit 230, a gate driving circuit 240, a power supply circuit 250, and a touch driving circuit 300.

The display panel 100 can include a touch panel in which touch sensors and/or touch wirings for touch sensing are disposed. In this regard, the touch panel can refer to a portion of the display panel 100 including components necessary for touch sensing, or can refer to a collection of the touch sensors and/or touch wirings disposed in the display panel 100.

The display panel 100 can include a strain panel in which strain sensors for sensing a change in a shape of the display panel 100 are disposed. The strain panel can refer to a portion of the display panel 100 including components necessary for sensing the change in the shape of the display panel, or can refer to a collection of strain sensors and/or strain wirings disposed in the display panel 100.

The display panel 100 can operate in a time-divided manner into a display period for image display and a touch period for touch sensing. During the display period, data of an input image can be written to a pixel array. During the touch period, the strain sensors and touch sensors can operate so that the presence or absence of deformation of the display panel can be detected, and the touch input can be detected.

The data driving circuit 230 can drive data lines S1 to Sm disposed in the display panel 100. For example, during the display period, the data driving circuit 230 can supply data voltage to a plurality of sub-pixels SP through the data lines S1 to Sm.

The gate driving circuit 240 can drive gate lines G1 to Gn disposed in the display panel 100. For example, during the display period, the gate driving circuit 240 can supply scan signals to the plurality of sub-pixels SP through the gate lines G1 to Gn.

The power supply circuit 250 can apply a high-potential power voltage and a low-potential power voltage to respectively a high-potential power terminal and a low-potential power terminal of each of the sub-pixels SP through the power supply lines during the display period.

The power supply circuit 250 can apply a strain driving signal and a touch driving signal, each having a certain period and a certain amplitude, to the strain sensor and the touch sensor, respectively, during the touch period.

Furthermore, the power supply circuit 250 can apply an alternating current signal having the same period and amplitude as those of the touch driving signal applied to the touch sensor to the high-potential power terminal and the low-potential power terminal of each of the sub-pixels through the power supply lines during the touch period, such that parasitic capacitance between the touch sensor and the power supply line can be minimized.

The touch driving circuit 300 can sense whether there is change in the shape of the display panel 100 using the strain sensors and/or the strain wirings disposed in the display panel 100.

The touch driving circuit 300 can sense the presence or absence of a user's touch and/or a touch location using the touch sensors and/or the touch wirings disposed in the display panel 100 through link lines L1-Li.

The timing controller 220 can receive timing signals such as a vertical synchronization signal Vsync, a horizontal synchronization signal Hsync, a data enable signal DE, and a main clock MCLK, etc. from a host system 210 and synchronize operation timings of the data driving circuit 230 using a data control signal DCS and the gate driving circuit 240 using the gate control signal GCS with each other, based on the received timing signals.

The host system 210 can be a wearable device with a built-in application program. The host system 210 can convert image data RGB into a format suitable for the resolution of the display panel 100. The host system 210 transmits the timing signals Vsync, Hsync, DE, and MCLK along with the image data RGB to the timing controller 220. Furthermore, the host system 210 can execute an application program related to coordinate data TDATA of the touch input received from the touch driving circuit 300.

The timing controller 220 or the host system 210 can generate a synchronization signal Tsync to synchronize an operation timing each of the data driving circuit 230, the gate driving circuit 240, the power supply circuit 250, and the timing controller 220 with an operation timing of the touch driving circuit 300.

The synchronization signal Tsync can be constructed such that a first period having a first signal level and a second period having a second signal level can be repeated. In this regard, the first signal level can be higher than the second signal level. In the synchronization signal Tsync, the first period can correspond to a display period Td, and the second period can correspond to the touch period Tt.

Furthermore, the synchronization signal Tsync can correspond to the vertical synchronization signal Vsync used for display operation. In this case, the display period Td can correspond to an active period in the vertical synchronization signal Vsync, and the touch period Tt can correspond to a blank period in the vertical synchronization signal Vsync.

Figure 2:
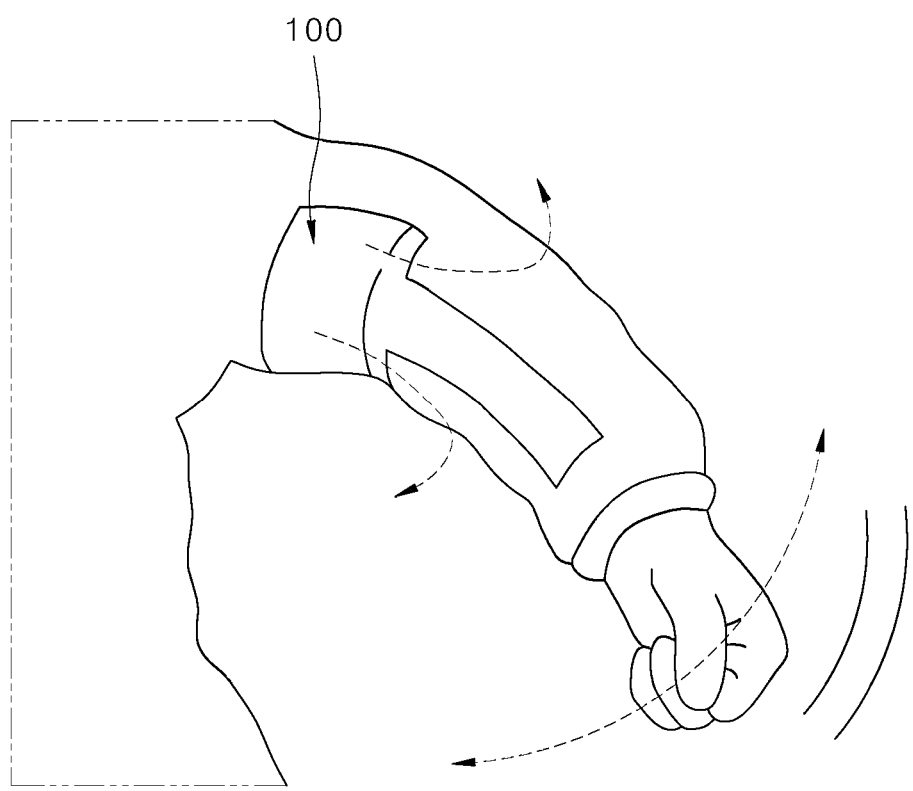
FIG. 2 is an example of a wearable device with a stretchable touch display device built therein according to an embodiment of the present disclosure.

FIG. 2 is an example of a wearable device with a stretchable touch display device built therein according to an embodiment of the present disclosure.

It can be difficult for workers in special fields, such as firefighters, soldiers, and special workers to use mobile phones or other touch input devices. Further, the workers in special fields such as firefighters, soldiers, and special workers can require real-time information related to the special fields, such as fire, battle and other urgent situations. In such instances, exposure thereof to risks and other dangers can be high. For this reason, workers in the special fields can require a wearable smart device with a stretchable display device built therein as a real-time information delivery and input device.

The stretchable touch display device can be embedded in the wearable device. In such a smart wearable device with the built-in stretchable display device, a shape of a stretchable touch panel can change depending on the movement of a wearer's body, such as the user's arm. But embodiments of the present disclosure are not limited thereto. For example, a shape change in a double curvature surface of a stretchable display panel can occur as the arm is folded or unfolded, or a shape change in the stretchable display panel that is bent in various directions can occur. As a result, the ghost touch can occur in touch raw data, thereby degrading the touch performance of the stretchable touch display device.

With reference to FIG. 2, the wearable device having the stretchable touch display device including the display panel 100 can be provided to an article of clothing or a garment, such as a uniform of the worker in the special fields, or can be provided as an equipment that can be attached to or connected to the unform or can be attached to or strapped on to the worker's body. In various embodiments of the present disclosure, a shape of the wearable device can be elongated so that the wearable device is longer in a first direction than a second direction that intersects the first direction. However, shapes of the wearable device are not limited thereto, and other shapes, such as a circular shape, a rectangular shape or others are also possible. Additionally, at least a portion of the wearable device can be flexible so that the wearable device is able to flex, bend or change shape according to placement of the wearable device on the garment or the body part of worker. In various embodiments of the present disclosure, the entire wearable device, including the stretchable touch display device that includes the display panel 100 can be flexible so that the wearable device can be used in the special fields.

Additionally, the stretchable touch display device can be used with a separate keyboard or a pen as an input device, whereby the keyboard or the pen can be connected to the stretchable touch display device by a wireless connection, such as Bluetooth, or by a wired connection. When connected to such an input device, the stretchable touch display device can be used as a dedicated display. But embodiments of the present disclosure are not limited thereto.

Figure 3:
FIG. 3 is a diagram for illustrating change in touch raw data according to change in a shape of a display panel in FIG. 2.

FIG. 3 is a diagram illustrating the change in the touch raw data according to the change in a shape of the display panel in FIG. 2.

The change in the touch raw data represents the change from touch data before the stretchable touch panel is bent to touch data when the stretchable touch panel has been bent.

FIG. 3 shows the change in the touch raw data caused by the touch, but the change in the touch raw data due to the change in the shape of the display panel, which causes a ghost phenomenon due to an increase in touch noise.

Regarding the stretchable touch panel, the shape of the stretchable touch panel changes depending on the movement of the arm. This change in the shape thereof causes an unintended change in the touch data or the touch raw data. Thus, a purpose of the present disclosure seeks to provide a stretchable touch display device to prevent deterioration of touch performance, such as mis-recognition or non-recognition of the touch. In this regard, a purpose of the present disclosure seeks to provide a stretchable touch display device in which a strain sensor is added to the display panel, and strain information sensed using the strain sensor is used to eliminate and minimize the ghost touch, thereby improving the touch performance.

With reference to FIG. 3, an upper view shows a plurality of touch sensors detecting a touch value in a non-touched state, where a baseline touch value can be within a predetermined range that is not recognized as a touch. For example, as shown in the upper view of FIG. 3, the baseline touch value can range from −5 to +5 so that some a basic level of noise is not recognized as a touch. In various embodiments of the present disclosure the baseline touch value can have a greater range from that less than −5 to that greater than +5, so as to provide a robust range to the stretchable touch panel that are used in demanding environments and an errant touch is not recognized as being a valid touch. But embodiments of the present disclosure are not limited thereto.

Additionally, with reference to FIG. 3, a lower view shows some of the plurality of touch sensors detecting an actual touch due to values being greater than the baseline touch value, but the touch being unintended touch (e.g., ghost touch) from flexing, bending or the shape change of the stretchable touch panel. As provided in the lower view of FIG. 3, a touch, even if unintended, is detected when the value detected by some of the plurality of touch sensors are different from the baseline touch value by a certain amount, or is a value outside the range of the baseline touch value. In various embodiments of the present disclosure, an unintended touch need not be caused by a change in the shape of the stretchable touch panel but can be from outside elements such as water, dirt or applied pressure from vegetation, etc., that is unintentionally imparted on the stretchable touch panel when the worker is out in the special fields.

Figure 4:
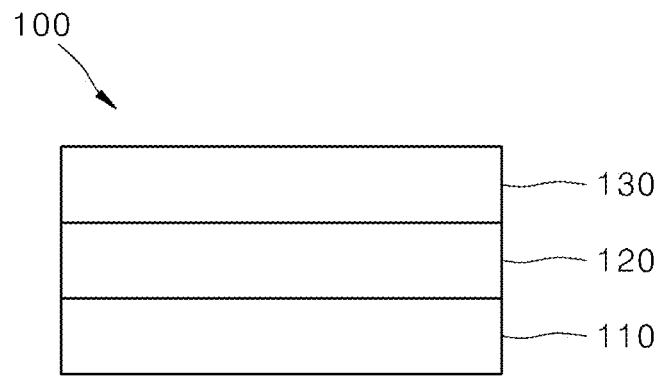
FIG. 4 is a schematic cross-sectional view of a display panel including a strain sensor in a stretchable touch display device according to an embodiment of the present disclosure.

FIG. 4 is a schematic cross-sectional view of a display panel including a strain sensor in a stretchable touch display device according to an embodiment of the present disclosure.

Referring to FIG. 4, the display panel 100 can include a stretchable strain panel 110, a stretchable display panel 120, and a stretchable touch panel 130.

The stretchable strain panel 110 includes a plurality of strain sensors and can be formed on a substrate of the display panel 100. For example, the strain sensor can be embodied as a strain sensor of various known schemes. But embodiments of the present disclosure are not limited thereto.

The stretchable display panel 120 includes a plurality of sub-pixels and can be formed on the stretchable strain panel 110.

The stretchable touch panel 130 includes a plurality of touch sensors and can be formed on the stretchable display panel 120. In this regard, each of the plurality of touch sensors can be embodied as a touch sensor of an in-cell scheme or a touch sensor of an add-on scheme.

FIG. 4 illustrates that the stretchable strain panel 110 is formed under the stretchable display panel 120. However, embodiments of the present disclosure are not limited thereto. The stretchable strain panel 110 can be formed on top of the stretchable display panel 120 or on top of the stretchable touch panel 130. Alternatively, the stretchable strain panel 110 can be built in the stretchable display panel 120 in a form of a sensor. But embodiments of the present disclosure are not limited thereto.

With reference to FIG. 4, an arrangement and/or a form of the stretchable strain panel 110, the stretchable display panel 120, and the stretchable touch panel 130 can vary. For example, the stretchable strain panel 110 can be located between the stretchable touch panel 130 and the stretchable display panel 120. Additionally, the stretchable strain panel 110 can be built in the stretchable touch panel 130 in a form of a sensor. Additionally, the stretchable touch panel 130 can be formed in the stretchable display panel 120.

When the stretchable touch panel 130 is formed in the stretchable strain panel 110 or in the stretchable display panel 120, the plurality of touch sensors of the stretchable touch panel 130 and the plurality of strain sensors of the stretchable strain panel 110 can be coplanar. When coplanar, the plurality of touch sensors and the plurality of strain sensors can be interdigitated with each other, or can be arranged in alternate rows and/or columns. But embodiments of the present disclosure are not limited thereto.

Additionally, when the stretchable touch panel 130 is formed in the stretchable display panel 120, the plurality of touch sensors of the stretchable touch panel 130 and the plurality of sub-pixels of the stretchable display panel 120. When coplanar, the plurality of touch sensors and the plurality of sub-pixels can be interdigitated with each other, or can be arranged in alternate rows and/or columns. But embodiments of the present disclosure are not limited thereto.

In other embodiments of the present disclosure, the stretchable strain panel 110, the stretchable display panel 120, and the stretchable touch panel 130 can be formed together, such as in a coplanar structure.

In various embodiments of the present disclosure, correspondences of the plurality of strain sensors of the stretchable strain panel 110, the plurality of sub-pixels of the on the stretchable display panel 120, and the plurality of touch sensors of the stretchable touch panel 130 can vary. For example, ratios of the plurality of strain sensors, the plurality of sub-pixels and the plurality of touch sensors can be defined as A:B:C, and A, B and C can each be 1 so that correspondences thereof can be 1:1:1. But embodiments of the present disclosure are not limited thereto. For example, the number of the plurality of sub-pixels can be greater than those of plurality of touch sensors and/or the plurality of strain sensors, so that the ratio is 1:4:1. Other ratios are possible, such as 1:2:3, 3:2:1, 2:4:2, for example. In various embodiments of the present disclosure, each of A, B and C can be a numeral from 1 to 100.

Figure 5:
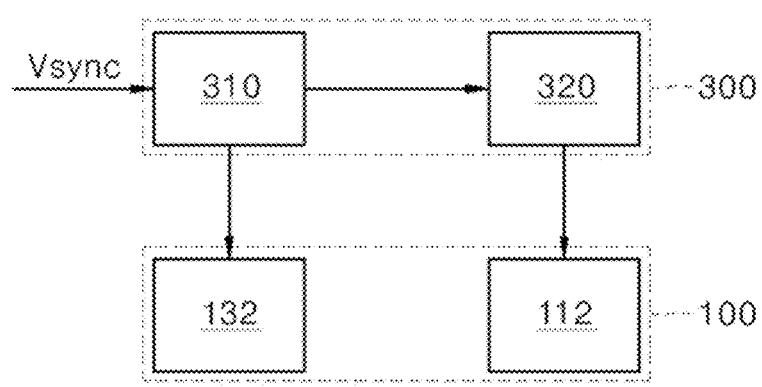
FIG. 5 is a block diagram for illustrating an operation of a stretchable touch display device according to an embodiment of the present disclosure.

FIG. 5 is a block diagram for illustrating an operation of a stretchable touch display device according to an embodiment of the present disclosure.

The stretchable touch display device includes the display panel 100 and the touch driving circuit 300.

The display panel 100 includes a strain sensor 112 for detecting a change in the shape of the display panel and a touch sensor 132 for detecting a touch on the display panel.

The touch driving circuit 300 can be configured to compensate for the change in the touch raw data based on the strain information sensed using the strain sensor 112, thereby removing the ghost touch.

In one example, the touch driving circuit 300 can be configured to include a master controller 310 that is configured to drive the touch sensor 132 and generate an enable signal for enabling the strain sensor 112, in response to the synchronization signal Tsync indicating the display period or the touch period, and a slave controller 320 that is configured to drive the strain sensor 112 in response to the enable signal provided from the master controller 310. In this regard, the synchronization signal Tsync can correspond to the vertical synchronization signal Vsync.

Figure 6:
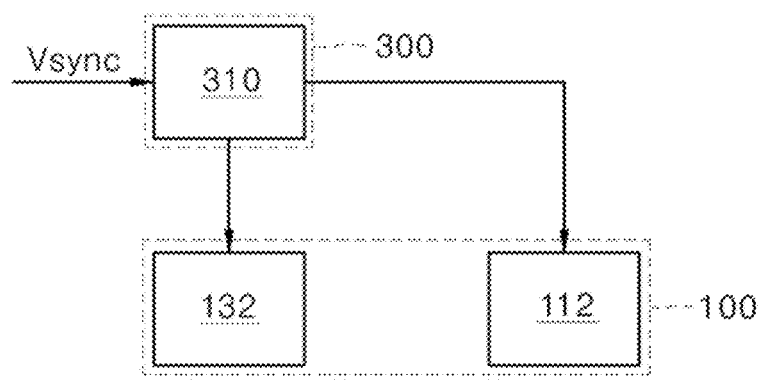
FIG. 6 is a block diagram for illustrating an operation of a stretchable touch display device according to another embodiment of the present disclosure.

FIG. 6 is a block diagram for illustrating an operation of a stretchable touch display device according to another embodiment of the present disclosure.

In another example, the touch driving circuit 300 can include a controller 310 that is configured to drive the touch sensor 132 and the strain sensor 112 in response to the synchronization signal Tsync indicating the display period or the touch period.

The controller 310 can determine whether there is the change in the shape of the display panel 100 based on a detection signal from the strain sensor 112. When it is determined that there is the change in the shape of the display panel 100, the controller 310 can compensate for the change in the touch raw data of the touch sensor 132 based on the change in a shape of the display panel 100.

Furthermore, when there is the change in a shape of the display panel 100, the controller 310 can update a value of a strain baseline, based on the detection signal of the strain sensor 112. In this regard, the value of the strain baseline can be used as reference data before the touch on the display panel 100 to determine the presence or absence of the touch and the touch coordinates.

Figure 7:
FIG. 7 is a timing diagram showing a driving method according to a first embodiment in a stretchable touch display device according to an embodiment of the present disclosure.

FIG. 7 is a timing diagram for illustrating a driving method according to a first embodiment in a stretchable touch display device according to an embodiment of the present disclosure.

Referring to FIG. 7, the stretchable touch display device can operate the display panel 100 in a time-divided manner into a display period Td for image display and a touch period Tt for touch sensing, based on the synchronization signal Vsync.

In response to the synchronization signal Vsync, the controller 310 can enable the strain sensor 112 and the touch sensor 132 at the same time by setting the strain enable signal to a low logic level during the touch period Tt.

The controller 310 can simultaneously drive the strain sensor 112 and the touch sensor 132 by applying a strain driving signal and a touch driving signal, each having a certain period and a certain amplitude, to the strain sensor 112 and the touch sensor 132, respectively, for a certain period of time.

Figure 8:
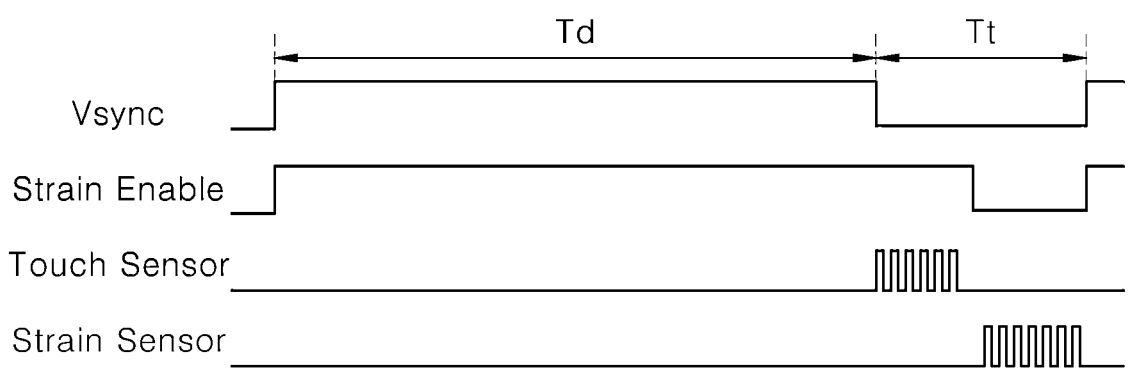
FIG. 8 is a timing diagram showing a driving method according to a second embodiment in a stretchable touch display device according to an embodiment of the present disclosure.

FIG. 8 is a timing diagram for illustrating a driving method according to a second embodiment in a stretchable touch display device according to an embodiment of the present disclosure.

Referring to FIG. 8, the stretchable touch display device can operate the display panel 100 in a time-divided manner into a display period Td for image display and a touch period Tt for touch sensing, based on the synchronization signal Vsync.

In response to the synchronization signal Vsync, the controller 310 can enable the touch sensor 132 during a prior part of the touch period Tt and subsequently enable the strain sensor 112 by setting the strain enable signal to a low logic level during a later part of the touch period Tt.

During the touch period Tt, the controller 310 can be configured to first drive the touch sensor 132 by applying the touch driving signal with a certain period and a certain amplitude to the touch sensor 132, and then drive the strain sensor 112 by applying a strain driving signal with the same period and amplitude as those of the touch driving signal to the strain sensor 112.

Figure 9:
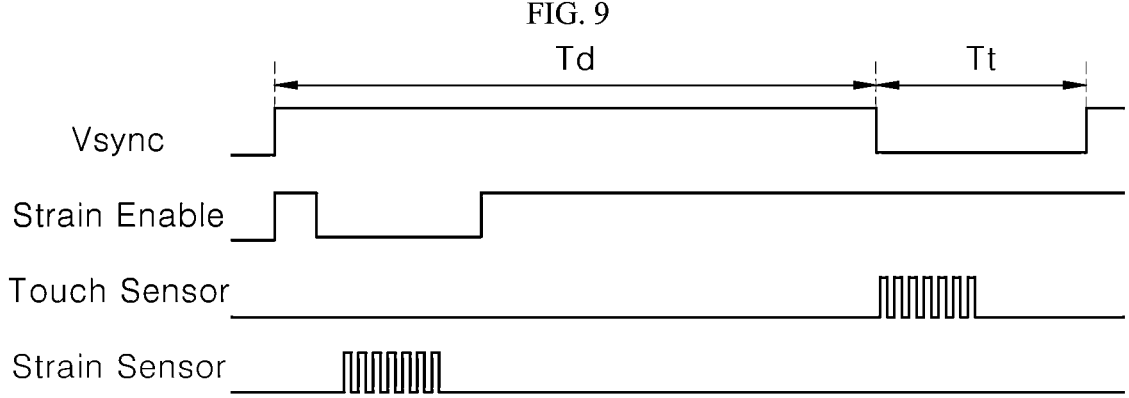
FIG. 9 is a timing diagram showing a driving method according to a third embodiment in a stretchable touch display device according to an embodiment of the present disclosure.

FIG. 9 is a timing diagram for illustrating a driving method according to a third embodiment in a stretchable touch display device according to an embodiment of the present disclosure.

Referring to FIG. 9, the stretchable touch display device can operate the display panel 100 in a time-divided manner into a display period Td for image display and a touch period Tt for touch sensing, based on the synchronization signal Vsync.

During the display period Td, the controller 310 can enable the strain sensor 112 by setting the strain enable signal to a low logic level for a partial time duration within the display period Td in response to the synchronization signal Vsync. Then, during the touch period Tt, the controller 310 can enable the touch sensor 132 in response to the synchronization signal Vsync.

The controller 310 can drive the strain sensor 112 by applying a strain driving signal with a certain period and a certain amplitude to the strain sensor 112 during the display period Td, and then can drive the touch sensor 132 by applying a touch driving signal with the same period and amplitude as those of the strain driving signal to the touch sensor 132 during the touch period Tt. But embodiments of the disclosure is not limited thereto, and the periods and the amplitudes of the touch driving signal and the strain driving signal need not be the same, and can be different from each other. For example, the period and/or the amplitude of the strain driving signal can be greater than that of the touch driving signal, or vice-versa.

In the embodiments as shown in FIG. 7 to FIG. 9, the time-divided scheme can be performed as follows: the controller can set the strain enable signal to the low logic level during the touch period Tt such that the controller can drive the touch sensor 132 and the strain sensor 112 simultaneously; alternatively, the controller can first drive one of the touch sensor 132 or the strain sensor 112 and then drive the other thereof; alternatively, the controller may The controller may enable the touch sensor 132 in response to the synchronization signal Vsync during the touch period Tt. Additionally, the touch driving signal and the strain driving signal can entirely overlap as shown in FIG. 7, or can entirely not overlap as shown in FIGS. 8 and 9. But embodiments of the present disclosure are not limited thereto. For example, the touch driving signal and the strain driving signal can partially overlap. Additionally, an overlap of the strain enable signal with one or more of the touch driving signal and the strain driving signal can be a full overlap, such as shown in FIG. 7. Regarding the overlap of the strain driving signal and the strain enable signal, the overlap can be exact (see FIG. 8), or can be full (see FIGS. 7 and 9) where a time period of the strain enable signal is greater than that of the strain driving signal.

FIG. 10 is a diagram illustrating compensation for change in touch raw data due to change in a shape of the display panel in FIG. 2.

To eliminate the ghost touch phenomenon that occurs when the stretchable touch panel is bent, the changes in the touch raw data due to the change in the shape of the touch panel can be compensated for based on the detection result from the strain sensor. Thus, the touch raw data value can be stabilized, and the ghost touch due to the change in the shape of the panel can be eliminated. FIG. 10 illustrates a value of the touch raw data from which the ghost touch has been removed by applying the compensation thereto.

Figure 11:
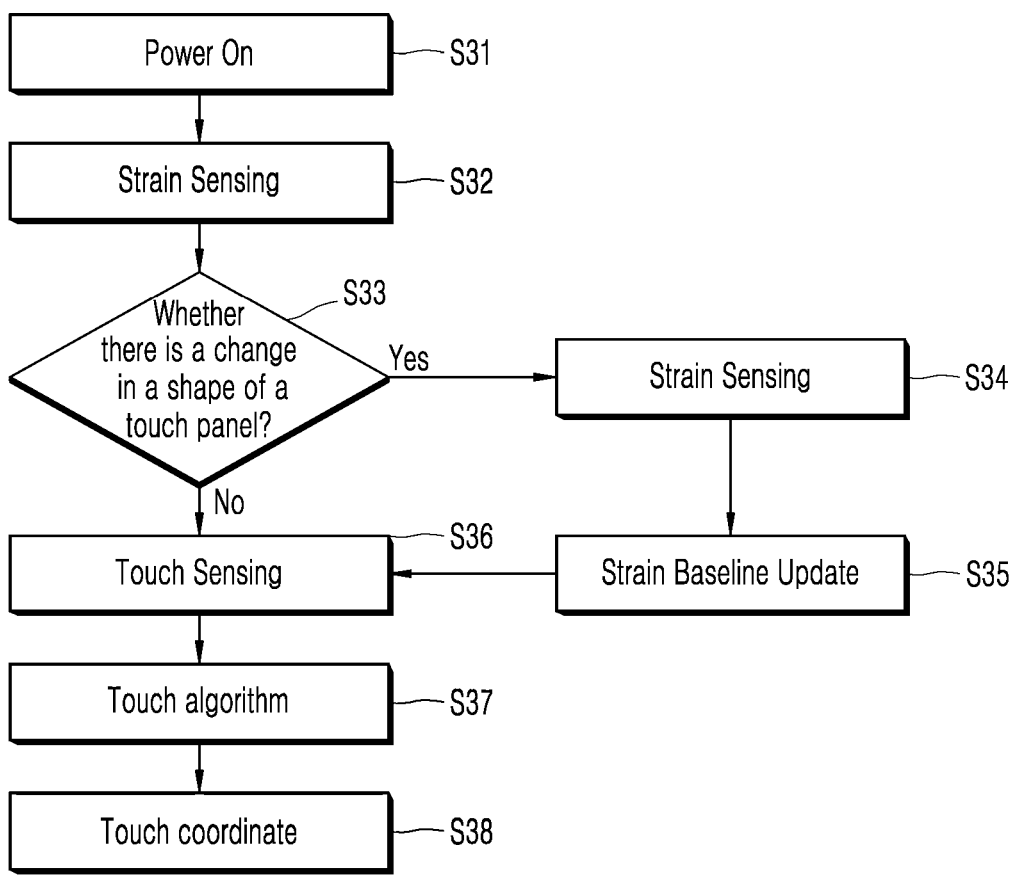
FIG. 11 is a flowchart for illustrating an operation of a stretchable touch display device according to an embodiment of the present disclosure.

FIG. 11 is a flowchart for illustrating an operation of a stretchable touch display device according to an embodiment of the present disclosure.

Referring to FIG. 11, the stretchable touch display device can enable the strain sensor at S32 after the power is turned on at S31 and then, can determine whether there is a change in the shape of the display panel 100 based on the detection signal from the strain sensor at S33.

The stretchable touch display device can compensate for the change in the touch raw data of the touch sensor 132 due to the change in the shape of the display panel 100 when there is the change in the shape of the display panel 100.

For example, the stretchable touch display device can drive the strain sensor when there is a change in a shape of the display panel and can receive the detection signal according to the change in the shape of the display panel from the stain sensor at S34. Then, the stretchable touch display device can update the value of the strain baseline used as the reference data before the touch on the display panel 100, based on the detection signal from the strain sensor at S35. But embodiments of the present disclosure are not limited thereto.

When there is a change in a shape in the display panel 100, the stretchable touch display device can update the value of the strain baseline and then can drive the touch sensor to perform touch sensing at S36. Alternatively, when there is no change in a shape of the display panel, the stretchable touch display device can perform touch sensing by driving the touch sensor 132 without driving the strain sensor 112 at S36.

In other embodiments of the present disclosure, the touch sensing at S36 can occur before the strain sensing at S32 and or the strain sensing at S34. When the touch sensing occurs before the strain sensing, the touch data can be stored or buffered in a memory or a buffer until the strain sensing is performed.

Then, the stretchable touch display device can perform a preset touch algorithm at S37 and can calculate the touch coordinates using the touch algorithm S38.

Figure 12A:
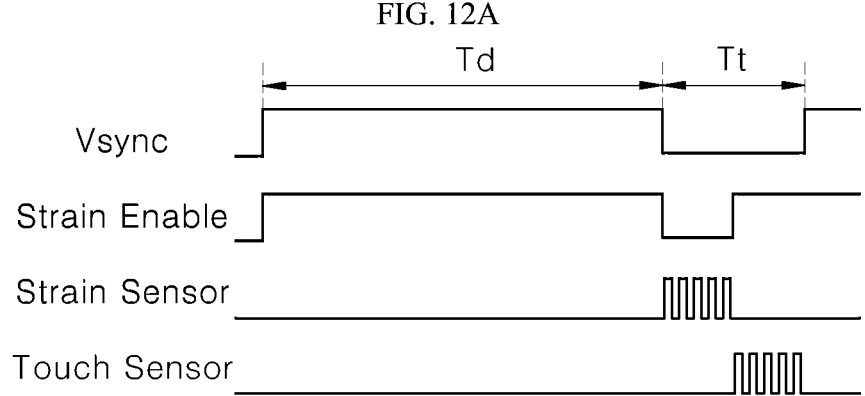
FIG. 12A is a timing diagram when there is change in a shape of the display panel in FIG. 11.

FIG. 12A is a timing diagram when there is a change in the shape of the display panel in FIG. 11.

Referring to FIG. 12A, when there is a shape change in the display panel 100, the stretchable touch display device can drive the strain sensor 112 by applying a strain driving signal with a certain period and a certain amplitude to the strain sensor 112 in synchronization with the strain enable signal being set to the low logic level during the touch period Tt, and then, after driving the strain sensor 112, can drive the touch sensor 132 by applying a touch driving signal with a certain period and a certain amplitude to the touch sensor 132 in synchronization with the touch enable signal during the touch period Tt.

Figure 12B:
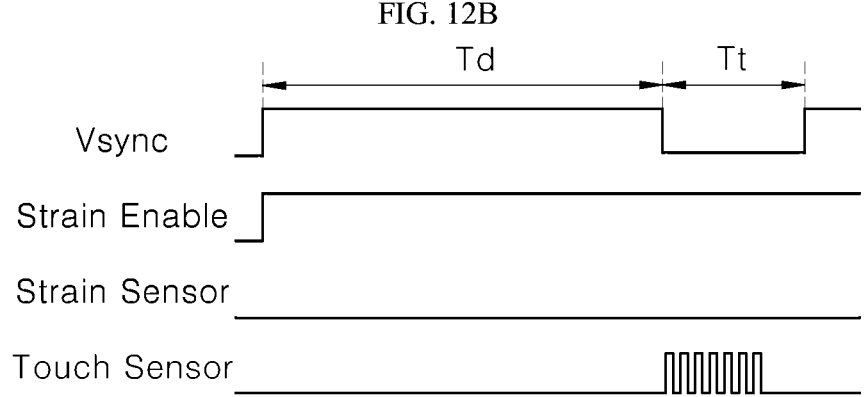
FIG. 12B is a timing diagram when there is no change in a shape of the display panel in FIG. 11.

FIG. 12B is a timing diagram when there is no change in a shape of the display panel in FIG. 11.

Referring to FIG. 12B, when there is no change in the shape of the display panel 100, the stretchable touch display device can drive the touch sensor 132 by applying a touch driving signal with a certain period and a certain amplitude to the touch sensor 132 in synchronization with the synchronization signal Vsync without driving the strain sensor 112 during the touch period Tt.

The timing at which the strain sensor 112 performs sensing and the timing at which the touch sensor 132 performs sensing can be allocated in a time divided manner or can be variable.

According to the above embodiments, the touch performance can be improved by removing the ghost touch due to the change in the shape of the touch panel.

Furthermore, the ghost touch can be eliminated by compensating for the touch raw data, based on the change of the shape of the stretchable touch panel based on the detection signal from the strain sensor.

Furthermore, the touch coordinates can be accurately detected by removing the ghost touch caused by the change in the shape of the stretchable touch panel.

A stretchable touch display device according to various aspects and embodiments of the present disclosure can be described as follows.

A first aspect of the present disclosure provides a stretchable touch display device comprising: a display panel; a touch sensor configured to detect a touch on the display panel; a strain sensor configured to detects a change in a shape of the display panel; and a controller configured to: determine whether there is a change in the shape of the display panel, based on a detection signal from the strain sensor; and upon determination that there is the change in the shape in the display panel, compensate for a change in touch raw data of the touch sensor, based on the change in the shape of the display panel.

According to some embodiments of the first aspect of the stretchable touch display device, when the device is powered, the controller is configured to enable the strain sensor to detect whether there is a change in the shape of the display panel.

According to some embodiments of the first aspect of the stretchable touch display device, upon determination that there is a change in the shape of the display panel, the controller is configured to update a value of a strain baseline based on the detection signal from the strain sensor, wherein the value of the strain baseline is used as reference data as a reference value before the touch on the display panel.

According to some embodiments of the first aspect of the stretchable touch display device, upon determination that there is a change in the shape of the display panel, the controller is configured to update the value of the strain baseline and to subsequently drive the touch sensor.

According to some embodiments of the first aspect of the stretchable touch display device, upon determination that there is no change in the shape of the display panel, the controller is configured to drive the touch sensor without driving the strain sensor.

According to some embodiments of the first aspect of the stretchable touch display device, the display panel operates in a time-divided manner into a display period for image display and a touch period for touch sensing, wherein the controller is configured to enable both the strain sensor and the touch sensor at the same time during the touch period.

According to some embodiments of the first aspect of the stretchable touch display device, the display panel operates in a time-divided manner into a display period for image display and a touch period for touch sensing, wherein during the touch period, the controller is configured to enable the touch sensor in a prior part of the touch period and subsequently enable the strain sensor in a later part of the touch period.

According to some embodiments of the first aspect of the stretchable touch display device, the display panel operates in a time-divided manner into a display period for image display and a touch period for touch sensing, wherein the controller is configured to enable the strain sensor for a partial time duration of the display period and to enable the touch sensor during the touch period.

According to some embodiments of the first aspect of the stretchable touch display device, the display panel includes: a stretchable strain panel including the strain sensor; a stretchable display panel formed on the stretchable strain panel; and a stretchable touch panel formed on the stretchable display panel and including the touch sensor.

A second aspect of the present disclosure provides a stretchable touch display device comprising: a display panel including a touch sensor for detecting a touch on the display panel, and a strain sensor for detecting a change in a shape of the display panel, wherein the display panel operates in a time-divided manner into a display period for image display and a touch period for touch sensing; and a touch driving circuit configured to: control an operation of each of the touch sensor and the strain sensor; determine whether there is a change in the shape of the display panel based on a detection signal from the strain sensor; and upon determination that there is a change in the shape of the display panel, compensate for change in touch raw data of the touch sensor, the change in the shape of the display panel.

According to some embodiments of the second aspect of the stretchable touch display device, the touch driving circuit includes: a master controller configured to drive the touch sensor and generate an enable signal to enable the strain sensor, in response to a synchronization signal indicating the display period or the touch period; and a slave controller configured to drive the strain sensor in response to the enable signal.

According to some embodiments of the second aspect of the stretchable touch display device, the touch driving circuit includes a controller configured to drive the touch sensor and the strain sensor in response to a synchronization signal indicating the display period or the touch period.

According to some embodiments of the second aspect of the stretchable touch display device, upon determination that there is a change in the shape of the display panel, the touch driving circuit is configured to update a value of a strain baseline based on the detection signal from the strain sensor, wherein the value of the strain baseline is used as reference data as a reference value before the touch on the display panel.

According to some embodiments of the second aspect of the stretchable touch display device, upon determination that there is a change in the shape of the display panel, the touch driving circuit is configured to update the value of the strain baseline and to subsequently drive the touch sensor.

According to some embodiments of the second aspect of the stretchable touch display device, upon determination that when there is no change in the shape of the display panel, the touch driving circuit is configured to drive the touch sensor without driving the strain sensor.

According to some embodiments of the second aspect of the stretchable touch display device, the touch driving circuit is configured to enable both the strain sensor and the touch sensor at the same time during the touch period.

According to some embodiments of the second aspect of the stretchable touch display device, the touch driving circuit is configured to enable the touch sensor and the strain sensor in a time-divided manner during the touch period.

According to some embodiments of the second aspect of the stretchable touch display device, the touch driving circuit is configured to enable the strain sensor for a partial time duration of the display period and enable the touch sensor during the touch period.

Although embodiments of the present disclosure have been described with reference to the accompanying drawings, the present disclosure is not limited to the above embodiments, but can be implemented in various different forms. A person skilled in the art can appreciate that the present disclosure can be practiced in other concrete forms without changing the technical spirit or essential characteristics of the present disclosure. Therefore, it should be appreciated that the embodiments as described above is not restrictive but illustrative in all respects.

What is claimed is:

1. A stretchable touch display device comprising:
a display panel;
a touch sensor configured to detect a touch on the display panel;
a strain sensor configured to detect a change in a shape of the display panel; and
a controller configured to:
determine whether there is the change in the shape of the display panel, based on a detection signal from the strain sensor; and
upon determination that there is the change in the shape in the display panel, update a value of a strain baseline based on the detection signal from the strain sensor,
wherein the value of the strain baseline is used as a reference value for before the touch on the display panel.

2. The stretchable touch display device of claim 1, wherein when the stretchable touch display device is powered, the controller is configured to enable the strain sensor to detect whether there is the change in the shape of the display panel.

3. The stretchable touch display device of claim 1, wherein upon determination that there is the change in the shape of the display panel, the controller is configured to update the value of the strain baseline and to subsequently drive the touch sensor.

4. The stretchable touch display device of claim 1, wherein upon determination that there is no change in the shape of the display panel, the controller is configured to drive the touch sensor without driving the strain sensor.

5. The stretchable touch display device of claim 1, wherein the display panel operates in a time-divided manner into a display period for image display and a touch period for touch sensing, and
wherein the controller is configured to enable both the strain sensor and the touch sensor at a same time during the touch period.

6. The stretchable touch display device of claim 1, wherein the display panel operates in a time-divided manner into a display period for image display and a touch period for touch sensing, and
wherein during the touch period, the controller is configured to enable the touch sensor in a prior part of the touch period and subsequently enable the strain sensor in a later part of the touch period.

7. The stretchable touch display device of claim 1, wherein the display panel operates in a time-divided manner into a display period for image display and a touch period for touch sensing, and
wherein the controller is configured to enable the strain sensor for a partial time duration of the display period and to enable the touch sensor during the touch period.

8. The stretchable touch display device of claim 1, wherein the display panel includes:
a stretchable strain panel including the strain sensor;
a stretchable display panel on the stretchable strain panel; and
a stretchable touch panel on the stretchable display panel and including the touch sensor.

9. A stretchable touch display device comprising:
a display panel including a touch sensor configured to detect a touch on the display panel, and a strain sensor configured to detect a change in a shape of the display panel, wherein the display panel operates in a time-divided manner into a display period for image display and a touch period for touch sensing; and
a touch driving circuit configured to:
control an operation of each of the touch sensor and the strain sensor;
determine whether there is a change in the shape of the display panel based on a detection signal from the strain sensor; and
upon determination that there is the change in the shape of the display panel, update a value of a strain baseline based on the detection signal from the strain sensor, wherein the value of the strain baseline is used as a reference value for before the touch on the display panel.

10. The stretchable touch display device of claim 9, wherein the touch driving circuit includes:
   a master controller configured to drive the touch sensor and generate an enable signal to enable the strain sensor, in response to a synchronization signal indicating the display period or the touch period; and
   a slave controller configured to drive the strain sensor in response to the enable signal.

11. The stretchable touch display device of claim 9, wherein the touch driving circuit includes a controller configured to drive the touch sensor and the strain sensor in response to a synchronization signal indicating the display period or the touch period.

12. The stretchable touch display device of claim 9, wherein upon determination that there is the change in the shape of the display panel, the touch driving circuit is configured to update the value of the strain baseline and to subsequently drive the touch sensor.

13. The stretchable touch display device of claim 9, wherein upon determination that when there is no change in the shape of the display panel, the touch driving circuit is configured to drive the touch sensor without driving the strain sensor.

14. The stretchable touch display device of claim 9, wherein the touch driving circuit is configured to enable both the strain sensor and the touch sensor at a same time during the touch period.

15. The stretchable touch display device of claim 14, wherein the touch driving circuit is configured to enable the touch sensor and the strain sensor in a time-divided manner during the touch period.

16. The stretchable touch display device of claim 9, wherein the touch driving circuit is configured to enable the strain sensor for a partial time duration of the display period and enable the touch sensor during the touch period.

17. A stretchable touch display device comprising:
   a display panel;
   a touch sensor configured to detect a touch on the display panel;
   a strain sensor configured to detect a change in a shape of the display panel; and
   a controller configured to:
   determine whether there is the change in the shape of the display panel, based on a detection signal from the strain sensor; and
   upon determination that there is the change in the shape in the display panel, update a baseline of the touch sensor.

18. The stretchable touch display device of claim 17, wherein the baseline is a reference data before the change in the shape of the display panel.

* * * * *